Patented Jan. 1, 1935

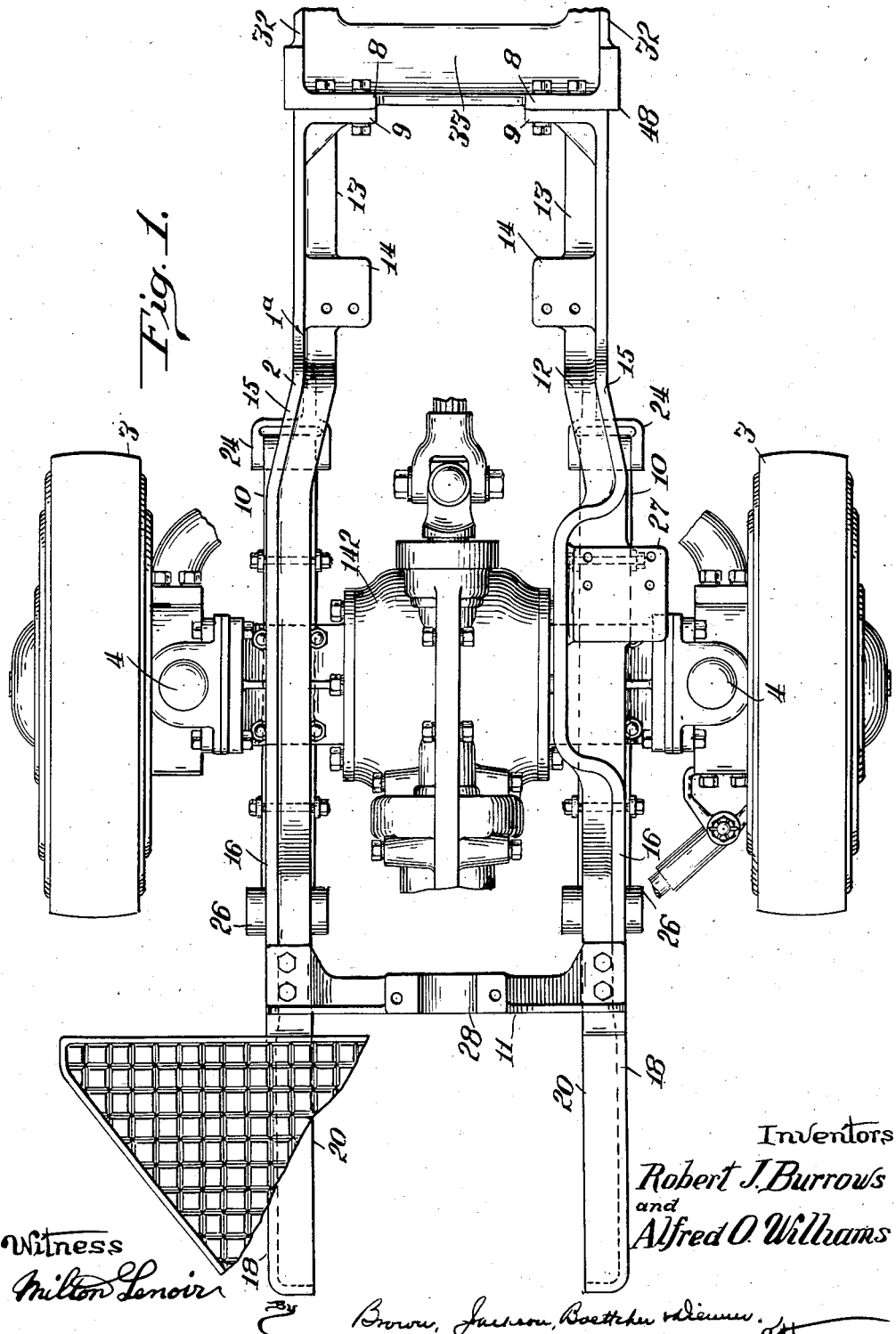

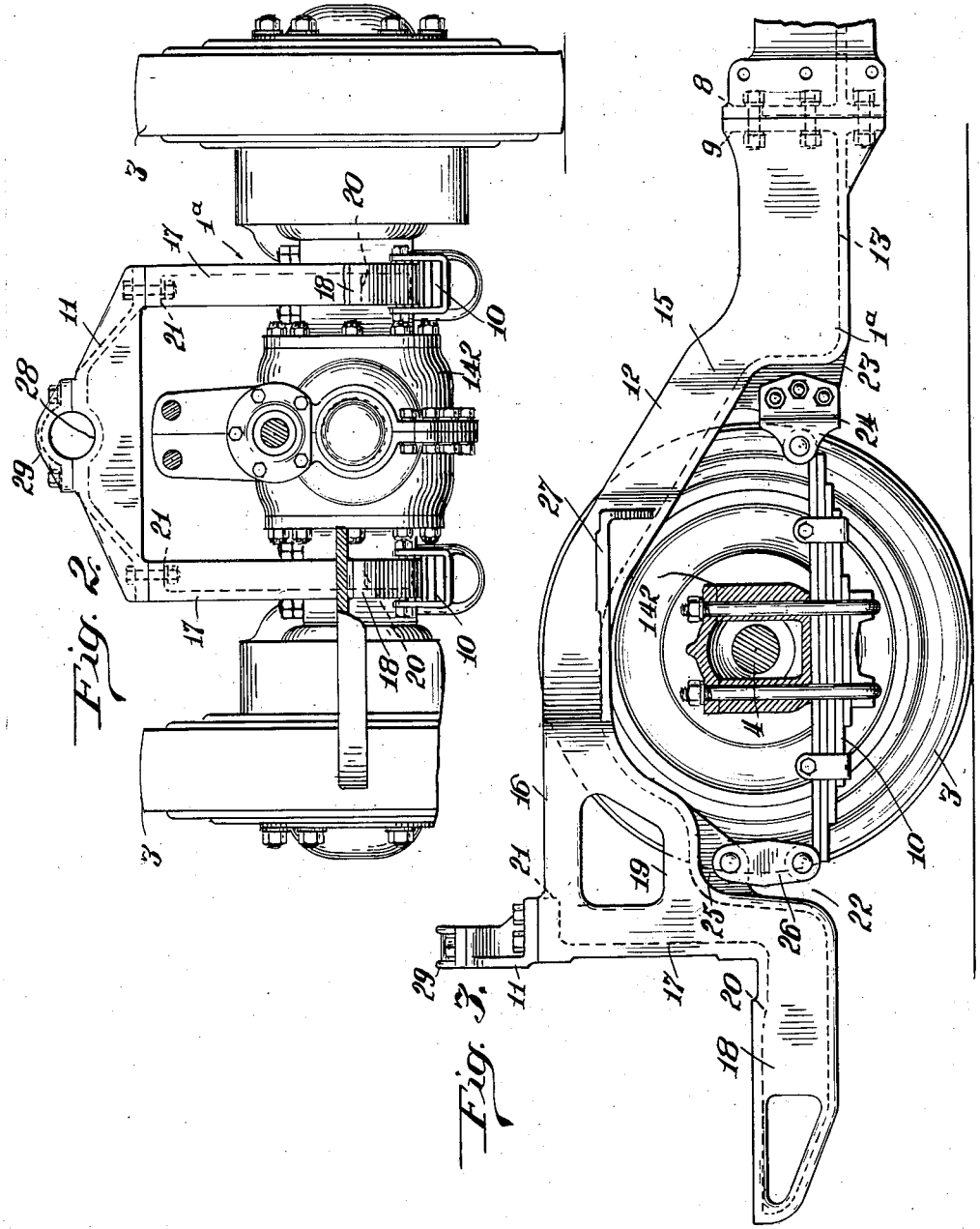

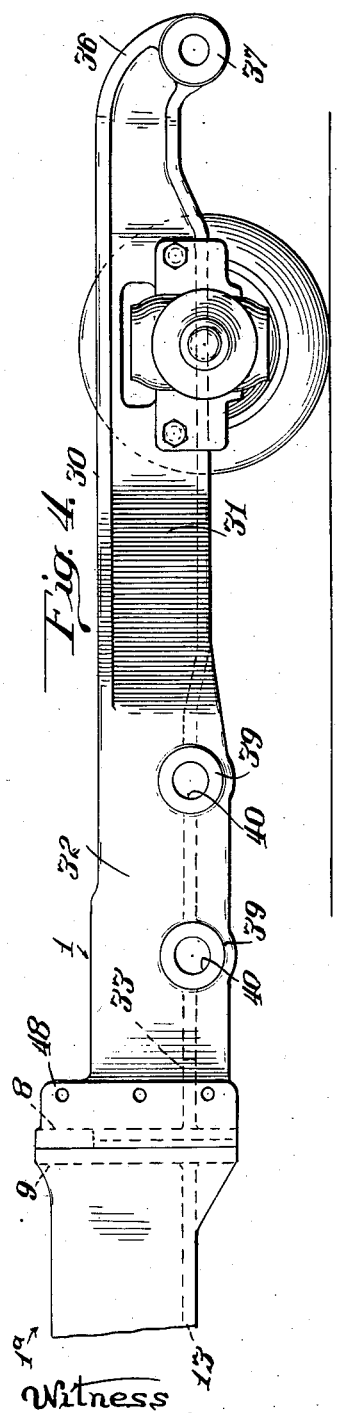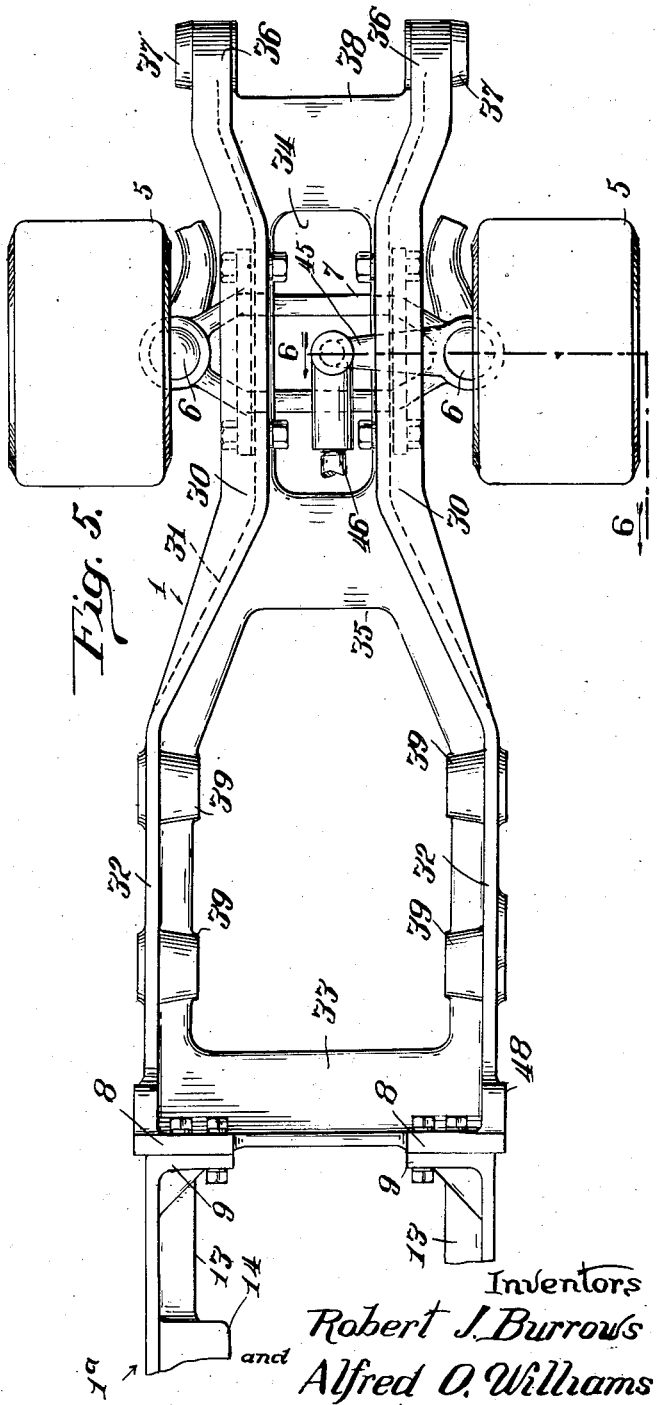

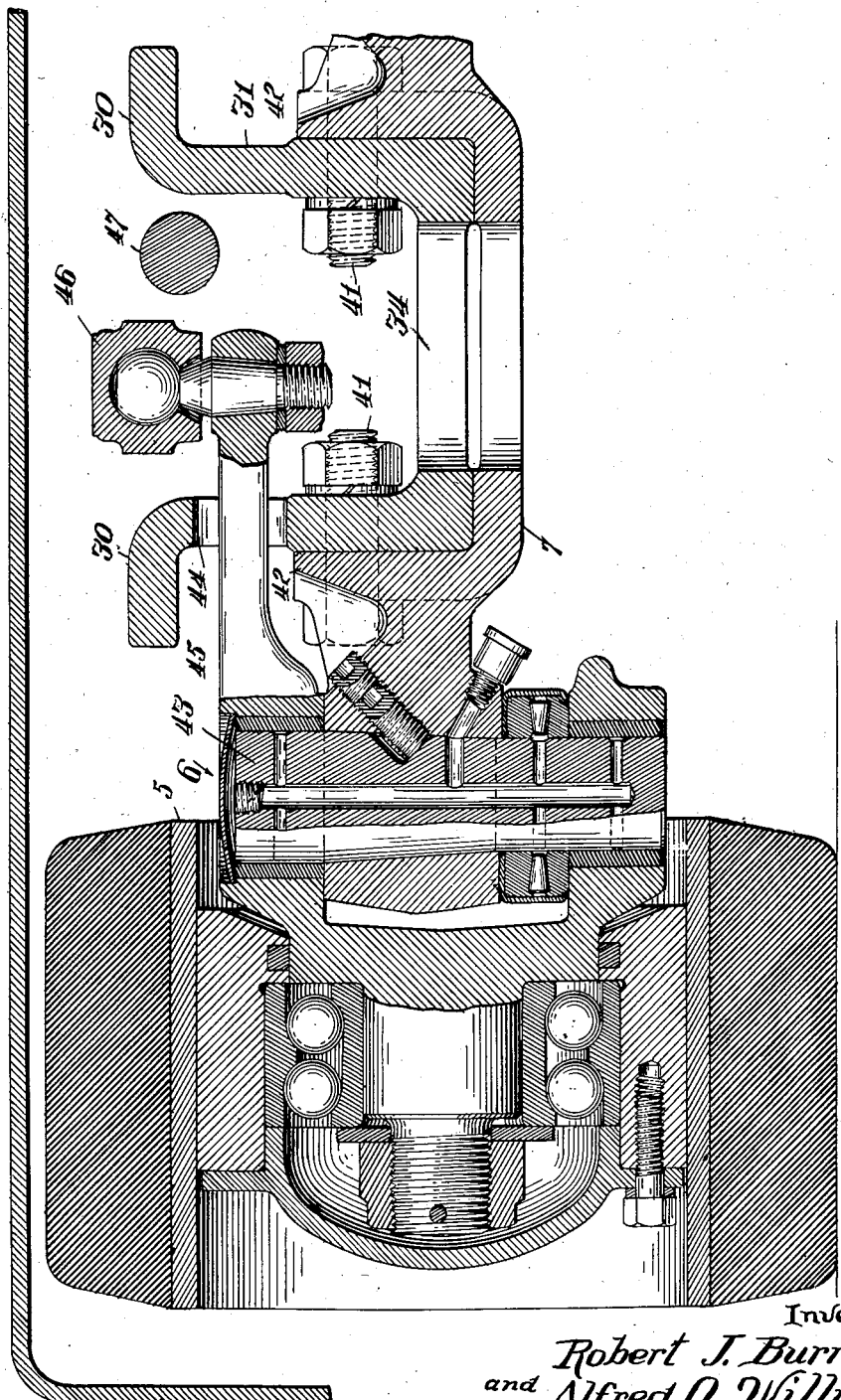

1,986,135

UNITED STATES PATENT OFFICE 1,986,135

LIFT TRUCK

Robert J. Burrows and Alfred O. Williams, Battle Creek, Mich., assignors to Clark Tructractor Company, Battle Creek, Mich., a corporation of Michigan Original application May 25, 1931, Serial No. 539,700. Divided and this application May 9, 1932, Serial No. 610,080

17 Claims. (Cl. 280—106)

This invention relates to lift trucks, and more particularly to a frame structure for a lift truck of the type driven by an internal combustion engine.

In our copending application Serial No. 539,700, filed May 25, 1931, we disclose a lift truck driven by a unidirectional internal combustion engine which is mounted over the driving wheels of the vehicle and connected thereto by constantly meshed gears controlled by clutches. The truck is mounted upon four wheels all of which are made dirigible to facilitate steering. A load carrying platform is mounted upon the truck and adapted to be lowered to permit it to be slipped under a merchandise pier and to be raised into transport position to thereby elevate the pier and merchandise contained upon it off of the floor in order that it may be conveyed about the premises by the truck.

Our present invention, which is a division of the above mentioned copending application, relates to the frame or chassis structure of the truck disclosed in this prior application.

In the design of a truck of this type it is necessary that the frame structure be exceedingly strong in order that it may resist the shocks placed upon it in service when the truck is carrying the heavy loads that it is designed to handle. Although the frame must be exceedingly strong, at the same time, it is essential that it be made as light as possible to reduce the dead-weight load of the truck to a reasonable figure.

To this end, in the preferred embodiment of our invention, we provide a frame composed of a plurality of formed sections, preferably composed of steel, and liberally flanged and recessed to give them the requisite strength with minimum weight. The individual frame members may be steel castings or steel forgings, as desired.

In the preferred embodiment of our invention the platform end of the truck is supported upon a flanged unitary frame member that is recessed to provide a wheel space in which the platform and wheels of the truck are disposed. This frame member also carries a plurality of journals in which transverse platform carrying shafts are disposed. The space between the side members of the frame structure is left open to reduce the weight of the frame and to provide a space in which are mounted the steering mechanisms and the platform raising and lowering mechanisms. The frame is shaped to form a guard for these mechanisms to thereby prevent them from being injured by coming into contact with obstructions as the truck is manipulated about the premises.

The motor end of the truck comprises a frame that is bolted to the platform of the truck and formed with an axle recess in which is disposed the driving axle of the truck. Spring shackle bosses project into this axle space to permit attaching the frame to the driving axle by means of spring members.

The transverse spacing of the main side members of the motor end of the frame is accomplished by the attachment of those members to the platform frame and by a transverse frame member which serves also as a motor support. The side members of the frame carry platform supporting brackets upon which the operator's platform is suitably attached, this platform aiding in holding the main frame members in proper relation transversely of the truck.

The main side members of the motor end frame of the vehicle are flanged and liberally recessed to provide the requisite strength with a minimum weight. These members also carry a plurality of mounting bosses upon which the motor instrumentalities of the truck are suitably attached.

The frame thus formed is amply strong and rigid to provide a suitable support for the motor driving devices and load carrying platform of the truck, and at the same time it is sufficiently light to permit keeping the dead-weight of the truck down to a reasonable value.

Our invention will be best understood by reference to the accompanying drawings in which a preferred embodiment of it is shown by way of example and in which:

Figure 1 is a plan view showing the motor end frame structure of the truck;

Figure 2 is an end elevational view showing the motor end of the truck frame;

Figure 3 is a side elevational view showing the motor end frame of the truck;

Figure 4 is an elevational view of the platform frame;

Figure 5 is a plan view of the platform frame; and

Figure 6 is a cross sectional view taken substantially along the line 6—6 of Figure 5 showing the details of the mounting of the platform frame upon its supporting wheel.

Referring now to the drawings in more detail, particularly to Figures 1 and 5, the truck frame comprises a platform carrying member indicated generally at 1 and a motor frame assembly indicated generally at 1a. The motor frame assembly is supported by driving wheels 3, which wheels are mounted to pivot about vertical axes 4 and connected together by suitable tie rods, not shown, to permit them to be turned about their vertical pivots by the steering mechanism of the truck in a manner which will be best understood from the detailed description of the steering mechanism contained in the parent application. The platform frame is mounted upon dirigible wheels 5 pivoted at 6 to an axle 7, as will be more fully explained hereinafter. These wheels likewise are used in steering. The frames 1 and 1a are each provided with mounting flanges 8 and 9, respectively, which are registered together and secured by bolts to firmly fasten the two sections of the truck frame together. The frame assembly 1a is mounted upon the driving axle 142 by suitable springs 10, which are rigidly secured to the driving axle and connected to the frame by means of shackles. The frame assembly 1a contains a single transverse member 11 for spacing the two side pieces thereof, which member 11 also serves as a motor mounting plate, as will presently appear.

As will be seen in Figures 1 and 3, the side members 2 and 12 of the motor frame assembly 1a consist of single piece members that are upwardly arched adjacent one end, and contain parallel flanged portions 13 which terminate in the mounting flanges 9 by which the platform frame is connected thereto. These portions 13 are flanged to give them the requisite strength, and are provided with inwardly extending bosses 14 which serve as mounting supports for the driving mechanism of the truck, as will presently appear. The frame members 2 and 12 extend in an upward and outward direction from the free end of the portions 13, as indicated at 15, and terminate in substantially parallel portions 16 located above and outside of the portions 13. Depending from the free end of the portions 16 are generally L-shaped brackets consisting of vertical portions 17 and horizontal portions 18, the latter serving as an operator's platform mounting support. Brace portions 19 extend from the vertical portion 17 to the portions 16, forming therewith an open space in the frame through which certain of the control devices may be projected.

The flanges 20, by which the members 2 and 12 are reinforced and stiffened, project inwardly of the frame and extend from the mounting bosses 9, along the bottom edges of the portions 13, 15, 19 and 18, and thence upward and over the upper edge of the platform bracket 18 and along the outer edge of the vertical portion 17. This flange 20 terminates in a mounting boss 21 located at the junction of portions 16 and 17 of the frame, upon which boss 21 the transverse frame member 11 is securely attached. The portions 15, 16, 19 and 17 together form a downwardly opening recess 22 in which the driving axle 142 and spring assembly 10 are disposed. Shackle bosses 23 are formed integral with the flange 20 at the junction of the frame portions 13 and 15 and project into this recess to serve as a mounting support for the shackle 24 by which one end of the spring assembly is secured to the frame. Similar shackle bosses 25 are formed integral with the flange 20 at the junction of the portions 17 and 19 and project into the recess 22 to serve as a mounting support for the spring shackle 26 by which the opposite end of the spring assembly 10 is secured to the frame.

The frame member 12 is provided with an outwardly projecting flat mounting boss 27 located at the junction of the portions 15 and 16. This boss serves as a mounting support for the pump, not shown, by which the platform of the truck is raised and lowered.

The driving motor of the vehicle, not shown, is mounted upon the frame members 2 and 12 by a three-point suspension. As is brought out in the above mentioned copending application, the power take-off end of the motor is securely attached to the transmission casing, which casing is secured to a cross angle that rests upon and is fixed to the bosses 14 of the frame. The crank end of the motor is nested in the saddle 28 in the transverse frame member 11, and held therein by the collar 29.

The platform frame, indicated generally at 1, comprises a channel-shaped section 30 disposed with its web 31 in engagement with the axle 7 by which the frame is supported. The flanges of this channel section 30 flare outwardly at 31 and are joined to parallel arms 32 which terminate in the mounting bosses 8 by which the frame member 1 is attached to the motor frame assembly of the vehicle. The ends of the arms 32 between the mounting bosses 8 are joined by a flange member 33, the web of which is an extension of the flanges of the arm sections 32. The web of the channel section 30 is cut away to provide an opening 34, and the webs of the arms 32 and the flange 33 are cut away to provide an opening 35, for a purpose which will hereinafter appear.

The opposite end of the channel 30 is flared outwardly to form arms 36 which are arcuate in shape and extend downwardly and terminate in integral bosses 37. These bosses are drilled and reamed on centers disposed at right angles to the longitudinal median line of the web 30. A transversely disposed shaft, not shown, is journaled in the bosses 37. This shaft serves as a mounting support for the platform structure, as is brought out in the above mentioned copending application. The web 38 of the frame is cut away short of the bosses 37 to provide a clear space in which is mounted a bell crank, not shown, by which the transverse platform supporting shaft is rotated.

The arms 32 contain bosses 39 centered upon the web portions of those arms, and drilled and reamed as at 40. These bosses form journals for receiving transverse shafts, not shown, by which the opposite end of the platform is mounted upon the frame. The bell cranks, by which these latter shafts are rotated, are mounted in the open space 35 in the frame in the manner detailed in the above mentioned copending application.

As will be seen in Figure 6, the axle member 7 by which the platform frame is supported upon the dirigible wheels 5, contains a socket into which the channel member 30 is seated and secured by bolts projected through bosses 42 on the axle member. This axle carries a vertically disposed pivot 43 by which the generally Y-shaped wheel spindle is pivotally connected to the axle. The flange of the channel 30 is cut away at 44 to provide an opening through which the steering arm 45 of the spindle is projected into the space between the flanges of the channel 30. Located within this space is a steering rod 46 which extends longitudinally of the frame and connects with the steering instrumentalities of the truck in the manner pointed out in our above mentioned copending application. In Figure 6 we have shown also a rod 47 by which the platform raising and lowering mechanism is actuated. This rod is disposed within the space of the channel member 30, and thus is protected from injuries resulting from its coming into contact with obstructions as the truck is manipulated about the premises.

With the arrangement shown, the frame member 1 extends only slightly below the wheel centers and the clearance between it and the floor is ample to permit the truck to be manipulated over obstructions likely to be encountered in the places in which the truck is designed to be used. The top edge of the frame is below the tops of the wheels, and the platform mounting bosses are disposed sufficiently below this frame edge to permit the platform to be lowered to facilitate loading the same. The frame structure cross braces itself and is capable of resisting stresses placed upon it diagonally by reason of the platform striking an obstruction as the truck is moved.

The frame member 1 contains a vertically disposed mounting boss 48 located adjacent the mounting boss 8 by which the frame member 1 is connected to the motor frame 1a. This boss 48 serves as a support for the cylinder, not shown, by which the platform structure is raised and lowered.

The frames 1 and 1a may conveniently be formed by casting or forging, and the bosses and surfaces upon which the various instrumentalities of the truck are mounted are preferably machined flat and smooth to afford a proper seating for securely fastening these devices to the frame. When so constructed the frame has ample strength to resist the stresses placed upon it in service, and is not unduly heavy.

While we have shown our invention by illustrating a preferred embodiment of it, we have done so by way of example only, as there are many modifications and adaptations which can be made by one skilled in the art within the teachings of our invention.

What is claimed is:

1. In a truck of the class described, the combination of a motor frame comprising longitudinal side members joined adjacent one end by a transverse member, said frame having bosses for receiving spring shackles, bosses for mounting a motor and transmission casing, platform arms projecting from the ends of said frame adjacent the transverse member, a mounting flange formed on the other end of the frame, and a platform frame having a mounting flange registered with and attached to said motor frame flange and having flanged side rails containing wheel mounting bosses and platform mounting means.

2. In a truck of the class described, a frame comprising the combination of an arched motor and operator's platform supporting frame having side members and a cross member, a load platform supporting frame secured to said first frame, and having side members and at least one cross member and bosses on said last mentioned frame for journaling transverse platform supporting shafts thereupon.

3. In a truck of the class described, a frame comprising the combination of a motor frame having side members joined adjacent one end by a cross member, motor support bosses on the frame, said frame being recessed to form an axle space, shackle bosses depending into said axle space, a platform frame secured to said motor frame and having side members and a cross member intermediate the ends thereof, and platform mounting bosses formed integral with said latter frame.

4. A frame for a lift truck comprising a platform frame supported at one of its ends by a pair of dirigible wheels, a motor frame secured to the other end of said frame and comprising a pair of members arched in side elevation and containing shackle mounting bosses located near the open ends of the members, and a transverse motor supporting member connecting said members and attached thereto adjacent the upper ends thereof.

5. A lift truck frame assembly comprising a dirigible wheel supporting axle, a unitary platform frame resting on said axle and bolted thereto, said frame consisting of a flanged member which is recessed adjacent said axle to form a wheel space, journal bosses formed in said member for receiving platform mounting and operating means, said member containing openings between said bosses in which said operating means are disposed, a motor frame bolted to said frame, said motor frame comprising parallel members each recessed to form a driving axle space, shackle bosses projected into said recesses to receive spring shackles by which the motor frame is mounted upon spring means carried by a driving axle, a transverse member joining said parallel members at one end of said recess and adapted to mount one end of a motor on said motor frame, and bosses formed integrally with said parallel members adjacent the other end of said recess and projecting inwardly of the frame to mount the other end of the motor thereon.

6. In a lift truck, a platform mounting frame comprising a channel disposed with its web lowermost, an axle engaging said web and bolted to the adjacent flanges of said channel, one end of said channel flaring outwardly and terminating in downwardly curved parallel arms, bosses on said arms adapted to support a shaft with its axis transversely of and at right angles to the median line of said channel, the other end of said channel also flaring outwardly and terminating in parallel arms of T-section, a transverse arm of T-section formed integral with and joining the free ends of said parallel arms, said transverse arm containing plane face bosses disposed at right angles to the median line of said channel and at equal distances therefrom, each of said parallel arms containing a plurality of journal bosses adapted to cooperate with a corresponding boss on the other parallel arm to support a shaft with its axis parallel to the axis of said first shaft, said bosses being positioned to support said shafts in a common horizontal plane.

7. In a lift truck, a motor mounting frame comprising a pair of parallel horizontal flanged portions spaced apart, mounting plates formed integral with said portions and extending inwardly from one of the ends of the same; a second pair of parallel flanged portions disposed above and to the outside of one end of said first pair of portions, connecting means formed integrally with said pairs of portions and extending from one end of said second pair of portions inwardly and downwardly to the adjacent ends of said first pair of portions, spring shackle bosses depending downwardly from the junctions of said first portions and said connecting means, L-shaped flanged portions having vertical legs formed integrally with the free ends of said second parallel portions and extending downwardly therefrom and horizontal legs disposed parallel to each other and extending outwardly from said frame, integral brace portions extending from said vertical legs to said second parallel portions, shackle bosses depending downwardly from the junctions of said vertical legs and brace portions, a transverse motor support connecting the free ends of said second parallel portions, and integral motor mounting bosses extending inwardly from the junctions of said first portions and connecting means.

8. In a lift truck, a motor mounting frame comprising a pair of parallel horizontal flanged portions spaced apart, mounting plates formed integral with said portions and extending inwardly from one of the ends of the same, a second pair of parallel flanged portions disposed above and to the outside of one end of said first pair of portions, connecting means formed integrally with said pairs of portions and extending from one end of said second pair of portions inwardly and downwardly to the adjacent ends of said first pair of portions, spring shackle bosses depending downwardly from the junctions of said first portions and said connecting means, L-shaped flanged portions having vertical legs formed integrally with the free ends of said second parallel portions and extending downwardly therefrom and horizontal legs disposed parallel to each other and extending outwardly from said frame, integral brace portions extending from said vertical legs to said second parallel portions, a pump mounting boss formed in one of said second parallel portions and extending from the junction of the corresponding brace therewith to the junction of said second portion and the corresponding connecting means, shackle bosses depending downwardly from the junctions of said vertical legs and brace portions, a transverse motor support connecting the free ends of said second parallel portions, and integral motor mounting bosses extending inwardly from the junctions of said first portions and connecting means.

9. A lift truck frame assembly comprising a dirigible wheel supporting axle, a platform frame mounted on said axle and secured thereto, said platform frame comprising a member which is recessed adjacent said axle to form a wheel space, journal bosses formed in said member for receiving platform mounting and operating means, said member containing an opening between said bosses in which said operating means are disposed, a motor frame secured to said platform frame, said motor frame comprising parallel members forming a driving axle space, shackle bosses projected into said space to receive spring shackles by which the motor frame is mounted upon spring means carried by a driving axle, a transverse member joining said parallel members at one end of said space and adapted to mount one end of a motor on said parallel members, and bosses formed integrally with said parallel members adjacent the other end of said space to mount the other end of the motor thereon.

10. In a lift truck, a platform mounting frame, an axle engaging said frame and secured thereto, one end of said frame terminating in a pair of arms, bosses on said arms adapted to support a shaft with its axis transversely of and at right angles to the median line of said frame, the other end of said frame flaring outwardly and terminating in parallel arms, a transverse arm formed integral with and joining the ends of said parallel arms, said transverse arm containing plane faced bosses disposed at right angles to the median line of said frame and at equal distance from the median line, each of said parallel arms containing a plurality of journal bosses adapted to cooperate with a corresponding boss on the other parallel arm to support shafts with their axes parallel to the axis of said first shaft.

11. In a platform lift truck, a platform frame comprising a pair of side members parallel to one another adjacent one end of the frame and extending inwardly from the parallel portions and then again outwardly towards the other end of the frame to form a narrowed portion intermediate the ends of the frame, and an axle having a recessed portion receiving and supporting the narrowed portion of said frame and extending transversely of the frame, said axle being fixed against turning movement and having dirigible wheel supports adjacent to and on the outer sides of the side members in the narrowed part of the frame.

12. In a platform lift truck, a platform frame comprising a pair of side members which are parallel to one another adjacent one end of the frame, said frame being narrowed adjacent its other end, a pair of wheels for the frame both located at the outer sides of the narrowed part of the frame, an axle supporting said wheels and having interfitted engagement with said side members at the narrowed part of the frame and rigidly secured thereto, said side members diverging from the narrowed part to said other end of the frame, and means at said other end of both side members for receiving a platform support.

13. A truck frame comprising a motor frame and a platform frame secured together end to end, the motor frame comprising spaced side members parallel to one another at the end that is secured to the platform frame and extending from said parallel portions outward and upward to elevated parallel portions defining an axle housing receiving space, the platform frame comprising spaced members parallel to one another at the end that is secured to the motor frame and extending inward from said parallel portions to form a narrowed portion, and extending outward from said narrowed portion to form a platform supporting portion at the end of the frame.

14. A lift truck frame comprising a motor frame and a platform frame connected together, each of said frames having two side members and at least one cross member, said motor frame being upwardly arched to provide an axle receiving space, the platform frame being contracted intermediate the ends thereof, supporting means for the contracted portion of the frame comprising wheels on the outer sides of the contracted portion of the platform frame.

15. A lift truck frame comprising a motor frame and a platform frame connected together, each of said frames having two side members and at least one cross member, said motor frame being upwardly arched to provide an axle receiving space, the platform frame being contracted intermediate the ends thereof, supporting means for the contracted portion of the frame comprising wheels on the outer sides of the contracted portion of the platform frame, the end of the platform frame which is remote from the motor frame being wider than the contracted part, and platform supporting means on the side members at said last mentioned end.

16. A lift truck comprising a platform frame and a motor frame, means for rigidly securing said frames together, said platform frame comprising parallel extending side members bent toward each other to form a narrowed portion intermediate the ends of said members and connected by integral webs extending between said side members and defining a central opening therebetween, supporting wheels for said platform frame, an axle for said wheels having a recessed socket portion receiving the narrowed portion of said frame, and means for rigidly securing said frame in said socket portion of said axle, said central opening having steering means for said wheels disposed therein.

17. A platform frame for a lift truck of the class described having a pair of parallel flanged side members, said members being laterally bent inwardly to form a narrowed portion intermediate the ends of said frame, a pair of integral webs extending between said members at said narrowed portion, an axle rigidly secured to said side members intermediate said webs, dirigible wheels supported by said axle and disposed outwardly of said narrowed portion, and a plurality of opposed platform-supporting bosses formed in spaced relation in said side members on opposite sides of said narrowed portion of said frame.

ROBERT J. BURROWS.
ALFRED O. WILLIAMS.

CERTIFICATE OF CORRECTION.

Patent No. 1,986,135.    January 1, 1935.

ROBERT J. BURROWS, ET AL.

It is hereby certified that error appears in the printed specification of the above numbered patent requiring correction as follows: Page 3, first column, line 61, claim 1, for "bosses" read means; and line 62, same claim, for "means" read bosses; and that the said Letters Patent should be read with these corrections therein that the same may conform to the record of the case in the Patent Office.

Signed and sealed this 5th day of March, A. D. 1935.

Leslie Frazer (Seal)    Acting Commissioner of Patents.